US012427450B2

(12) United States Patent
Heitele

(10) Patent No.: US 12,427,450 B2
(45) Date of Patent: Sep. 30, 2025

(54) WATER TANK WITH TANK OUTLET VALVE AND WATER FILTER CARTRIDGE WITH TWO WATER FILTER CARTRIDGE OUTLETS WHICH ARE ARRANGED CONCENTRICALLY TO ONE ANOTHER

(71) Applicant: AQUIS WASSER-LUFT-SYSTEME GMBH, LINDAU, ZWEIGNIEDERLASSUNG REBSTEIN, Rebstein (CH)

(72) Inventor: Bernd Heitele, Marbach (CH)

(73) Assignee: AQUIS WASSER-LUFT-SYSTEME GMBH, Lindau, Rebstein (CH)

(*) Notice: Subject to any disclaimer, the term of this patent is extended or adjusted under 35 U.S.C. 154(b) by 718 days.

(21) Appl. No.: 17/706,540

(22) Filed: Mar. 28, 2022

(65) Prior Publication Data
US 2022/0305412 A1 Sep. 29, 2022

(30) Foreign Application Priority Data
Mar. 29, 2021 (DE) ..................... 10 2021 107 855.5

(51) Int. Cl.
*B01D 29/31* (2006.01)
*B01D 15/36* (2006.01)
(Continued)

(52) U.S. Cl.
CPC ........... *B01D 29/92* (2013.01); *B01D 15/361* (2013.01); *B01D 29/31* (2013.01); *B01D 35/153* (2013.01);
(Continued)

(58) Field of Classification Search
CPC ............... B01D 29/31; B01D 35/0276; B01D 2201/347; C02F 2201/003; C02F 2201/006
See application file for complete search history.

(56) References Cited

U.S. PATENT DOCUMENTS 3,467,256 A * 9/1969 Humbert, Jr. .......... B01D 27/06
210/493.1
2004/0104161 A1 6/2004 Gaignet et al.
(Continued)

FOREIGN PATENT DOCUMENTS

DE 202016107339 U1 * 2/2017
EP 1596057 A2 * 11/2005 ......... B01D 35/0276
(Continued)

OTHER PUBLICATIONS

Sommer—DE 202016107339 machine translation—2017 (Year: 2017).*
(Continued)

Primary Examiner — Bradley R Spies
(74) Attorney, Agent, or Firm — BRENEMAN & GEORGES

(57) ABSTRACT

The invention relates to a water tank (1) and a water filter cartridge (2) where the water filter cartridge (2) has two different water filter cartridge outlets connected to two different filter treatment sections in a single filter cartridge housing to provide for the different treatment of water received from a common inlet. More particularly, the new filter can treat hot water separately from cold water and discharge the separately treated water from the which can be arranged concentrically to one another.

21 Claims, 3 Drawing Sheets

Figure 1:
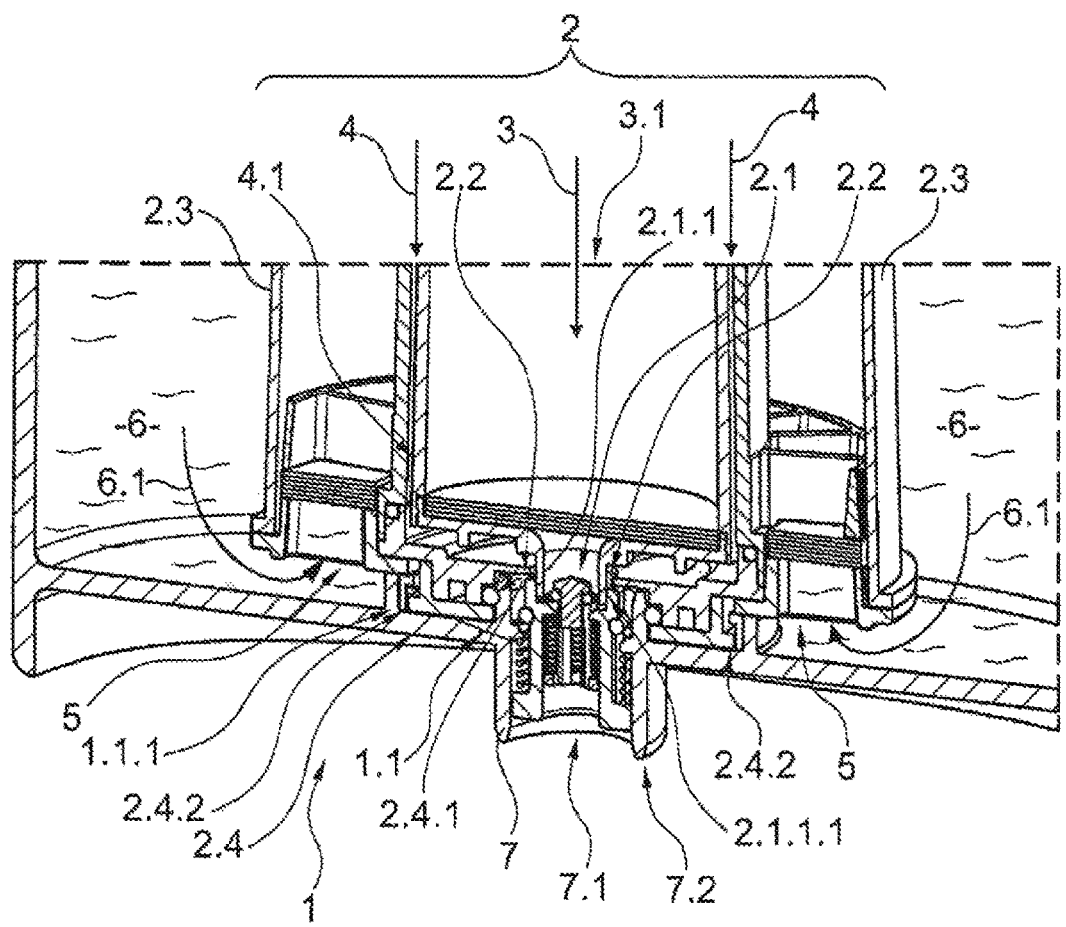
Figure 1:
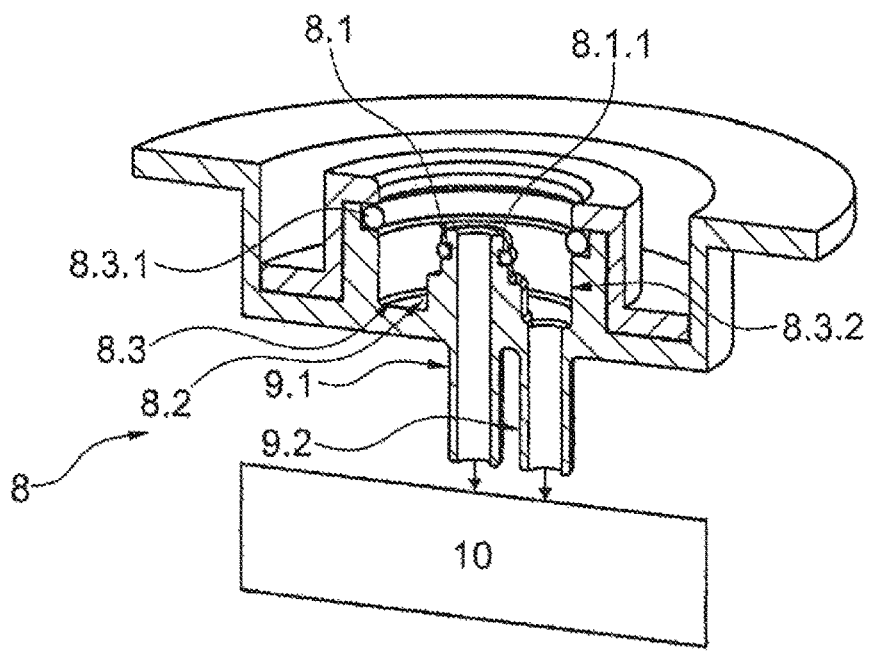

(51) Int. Cl.
 *B01D 29/92* (2006.01)
 *B01D 35/153* (2006.01)
 *C02F 1/00* (2023.01)
 *C02F 1/28* (2023.01)
 *C02F 1/42* (2023.01)

(52) U.S. Cl.
 CPC .............. *C02F 1/003* (2013.01); *C02F 1/283* (2013.01); *C02F 1/42* (2013.01); *B01D 2201/347* (2013.01); *B01D 2201/4015* (2013.01); *C02F 2201/004* (2013.01); *C02F 2201/006* (2013.01)

(56) References Cited

U.S. PATENT DOCUMENTS

2017/0050132 A1\* 2/2017 Heitele .................... F24F 6/12
2020/0369537 A1 11/2020 Heitele

FOREIGN PATENT DOCUMENTS

| GB | 993876 A | 6/1965 |
| JP | 2014-138938 A | 7/2014 |
| KR | 200 404 491 Y1 | 12/2005 |
| WO | WO 2016/110321 A1 | 7/2016 |
| WO | WO 2017/037701 A1 | 3/2017 |

OTHER PUBLICATIONS

Schreckenberger—EP 1596057 machine translation—2005 (Year: 2005).\*
Takeda—JP 2014138938 machine translation—2014 (Year: 2014).\*

\* cited by examiner

WATER TANK WITH TANK OUTLET VALVE AND WATER FILTER CARTRIDGE WITH TWO WATER FILTER CARTRIDGE OUTLETS WHICH ARE ARRANGED CONCENTRICALLY TO ONE ANOTHER

The invention relates to a water tank with a water filter cartridge and a water processing appliance equipped therewith according to the preambles of claims 1 and 17.

PRIOR ART

Water processing appliances are becoming increasingly popular. Firstly in the form of cold water processing appliances and secondly in the form of hot water processing appliances.

Cold water processing appliances may be drinking water dispensers, for example. Hot water processing appliances may be coffee machines and/or tea machines, or the like, for example.

In order to ensure that the water which is correspondingly processed by these appliances/machines corresponds to the relevant health requirements, at least one activated carbon filtering of the water used is generally provided prior to this processing, and if required a filtration in order to remove undesired flavors.

In the case of hot water processing machines, generally a filter section is also provided for descaling the water used and thus for protecting the machine parts coming into contact therewith, such as the heating system and pipelines.

In the prior art, US 2004/0104161 A1 discloses a module for purifying fluid, in particular water, comprising a water filter cartridge with an inlet and outlets which are arranged concentrically to one another for permeate and retentate.

JP 2014-138938 A discloses a water filter cartridge with water filter cartridge outlets which are arranged concentrically to one another for the processed water.

OBJECT AND ADVANTAGES OF THE INVENTION

The object of the invention is to provide a water filter structure and connecting structure by which a water processing machine, according to the prior art described in the introduction, may be reliably supplied with water both for cold processing and for hot processing, with the best possible use of the tank volume for water storage.

Proceeding from the preambles of claims 1 and 17 the object is achieved by the characterizing features thereof. Advantageous and expedient embodiments are specified in the subclaims.

Accordingly, the invention relates to a water tank with water filter cartridge, wherein the water filter cartridge comprises two water filter cartridge outlets which are arranged concentrically to one another.

This permits the provision of two water flows or filtrate flows which are conducted in a single water filter cartridge but for different purposes of use (subsequent cold water processing and subsequent hot water processing in a beverage processing machine) via in each case different processing sections, and which are accordingly also supplied from a water tank jointly feeding the two filter sections of the one water filter cartridge.

When water is heated (hot water processing) minerals are released from the water from a temperature of above 60° C., in particular from 65° C., and are deposited on the surrounding surfaces, in particular in the form of limescale. This has a negative effect on the operation and the service life of the machine components affected thereby and ultimately also on the machine. On the one hand, such deposits are insulative and thus reduce the efficiency of the heating system and, on the other hand, they progressively reduce the effective cross section of the affected pipelines.

However, this calcification effect plays a relatively subordinate role in the provision of cold, unheated water, for example in the form of drinking water dispenser. The requirements for filtering the feed water used therefor may thus be correspondingly lower but at least different from those for the hot water processing.

In order to make the action of the filter material as useful as possible for the hot water processing, therefore, a first separate flow channel through the water filter cartridge is provided for this purpose, in particular preferably only for this purpose. This flow channel feeds into the first water filter cartridge outlet. A second flow channel, which is separate from the first flow channel in terms of pipeline technology for supplying the cold water processing, feeds into the second water filter cartridge outlet.

The first flow channel or flow path through the water filter cartridge, which is provided for feeding the subsequent hot water processing in the machine, may accordingly comprise a filter chamber with a descaling agent, which in particular may contain an ion exchanger, through which the water to be processed flows in order to avoid such precipitates and limescale deposits.

For connecting the two water filter cartridge outlets, which are configured separately from one another, to the water tank, overall only a single water-conducting connecting element with two conduits which are separate from one another in terms of pipeline technology is required on the water tank, for conducting the two water flows which are guided separately out of the water filter cartridge.

This has the advantage that two separately configured water conduits only have to be sealed at a common contact point between the water filter cartridge and the water tank. This is significantly simpler and more reliable to implement, in particular when detaching the water tank from, and reconnecting the water tank to, a beverage processing machine operated with the water tank and the water filter cartridge, than for example in the case of two water conduits which are configured separately from one another and which also always have to be aligned simultaneously and correctly in order to avoid the undesirable discharge of water in the connecting region.

This is important since with each refilling process the water tank is generally removed from the beverage processing machine, filled with water and reconnected to the machine so as to be able to conduct water, and at the same time as far as possible no water should be discharged from the structure provided for conducting water between the water tank and/or the water filter cartridge and the machine, and splash the tank connecting region of the machine in an undesirable manner.

This is because water which is discharged in this manner not only has an unattractive, non-user-friendly effect, since it should be already removed simply for hygienic and visual reasons. In addition, it may put at risk the reliable operation of the machine since parts thereof could possibly become faulty, due to the penetration of the water into the machine, or potentially there could also be the risk of an electric shock to the user of the machine due to the contact of the water with electrical cables.

The first of the two water filter cartridge outlets which are arranged concentrically to one another may be arranged so as to be at least axially, preferably also radially, movable in the housing of the water filter cartridge.

As a result, the water filter cartridge outlet may be connected fixedly and in a reliably sealed manner to a complementary sealing element which is also movable but which is arranged on the water tank and which may be configured, in particular, as a spring-loaded water tank outlet valve. Preferably, this first water filter cartridge outlet is configured in this case so as to be able to be connected to the valve tappet of the relevant water tank outlet valve.

The water tank outlet valve is preferably the water tank outlet valve assigned to the second, outer water filter cartridge outlet of the two water filter cartridge outlets which are arranged concentrically to one another.

Due to the mobility provided to the first water filter cartridge outlet, this first water filter cartridge outlet may perform opening and closing movements with the water tank outlet valve relative to the water tank, without any relative positional change between the water tank outlet valve and the water filter cartridge outlet.

In other words, if the valve tappet of this second water tank outlet valve is actuated, then this valve opens and thus opens up the second water filter cartridge outlet, when the water tank is correspondingly filled, for the removal of the water processed via the second water filter channel.

In this case the first water filter cartridge outlet may move with the valve tappet of the second water tank outlet valve. The seal of the first water filter cartridge outlet is implemented by a further water tank outlet valve which is assigned to the first water filter cartridge outlet and which is arranged concentrically inside the water tank outlet valve assigned to the second water filter cartridge outlet.

This further water tank outlet valve, which is assigned to the first water filter cartridge outlet, is denoted as the first water tank outlet valve for unifying the references between the different components and for a clearer assignment when referring to the first flow channel through the water filter cartridge. The same applies to the water tank outlet valve which is assigned to the second flow channel and which is thus denoted as the second water tank outlet valve, and also to all further components for conducting water downstream of the respective flow channel to the beverage processing machine.

The first movably arranged water filter cartridge outlet may be configured in the manner of a plug-in element with a tubular portion for water-tight interaction with a complementary water filter cartridge connecting element, in particular the tank outlet valve, arranged on the tank side.

Preferably, the tubular portion of the water filter cartridge outlet is manufactured from a more flexible material than the complementary water filter cartridge connecting element, in particular the tank outlet valve, arranged on the tank side. As a result, said tubular portion may be manufactured with a very accurate fit, optionally with a slight oversizing or undersizing relative to the complementary valve element, preferably the valve tappet thereof, and plugged therein.

In one embodiment in which the first water filter cartridge outlet is configured so as to be able to be plugged into a receiving opening configured so the water tank outlet valve, the radially external wall of the tubular portion thereof forms a sealing surface for bearing against the radially internal surface of the complementary receiving opening on the tank outlet valve. Due to the relatively more flexible material, and optionally a slight oversizing, the tubular portion may form a particularly tight and well-sealed press fit with the receiving opening on the tank valve.

The fixing forces of this press fit are sufficiently great that they also reliably counteract a pulling effect which potentially may occur during the removal of the water tank from the beverage processing machine if the tank valve on the appliance side is temporarily jammed.

In a further embodiment, the first water filter cartridge outlet is configured so as to be able to be plugged onto the water tank outlet valve, preferably onto the valve tappet thereof. At the same time, the radially internal wall of the tubular portion thereof forms a sealing surface for bearing against the radially external surface of the complementary receiving part on the tank outlet valve. In this case, due to the relatively more flexible material and optionally a slight undersizing, the tubular portion may also form a particularly tight and well-sealed press fit with the receiving opening on the tank valve and, as described relative to the above embodiment, reliably counteract the water filter cartridge outlet being pulled off.

In this embodiment the tubular portion may also form a sealing surface which acts radially relative to the complementary water filter cartridge connecting element arranged on the tank side. In this case on the radially internal surface thereof, which bears against the tank outlet valve relative to a radially external surface.

The first of the two water filter cartridge outlets which are arranged concentrically to one another is assigned to a first flow channel formed by the water filter cartridge and the second water filter cartridge outlet is assigned to a second flow channel which is configured at least in some portions separately from the first flow channel through the water filter cartridge.

The first flow channel comprises a filter chamber which is arranged so as to be at least axially, preferably also radially, movable in the housing of the water filter cartridge. As a result, the first water filter cartridge outlet may be connected fixedly to the filter chamber, for example in the form of an outlet connector integrally formed on the filter chamber. This outlet connector may be fixedly connected to the tank outlet valve, for example by means of a plug connection, as already described above.

Spacing ribs and/or spacing studs or the like may be formed on the movably arranged filter chamber and/or in a complementary receiving chamber for the filter chamber in the water filter cartridge, for spacing apart the two chambers from one another. As a result, a desired flow cross section may be ensured between the wall of the receiving chamber and the housing of the filter chamber which is movably arranged therein, which may be, for example, part of the second flow channel of the water filter cartridge.

Preferably, the complementary receiving chamber for the filter chamber is configured as a flow chamber without filter material and as part of the second flow channel. As a result, the filter chamber may be arranged as far as possible so as to be movable unhindered in the receiving chamber and follow the movement of the tank valve, in the above-described manner.

Preferably, a non-return valve is arranged in at least one of the two flow channels. As a result, a safety element may be provided in the filter cartridge for the relevant flow channel against undesired backsiphonage from a downstream pipeline region, in particular against undesired backsiphonage from the other flow channel.

Particularly preferably, a non-return valve is also arranged in the second of the two flow channels. Thus a reliable protection may be ensured for both flow channels against a backsiphonage of liquid from a downstream region.

The water filter cartridge may also have a cartridge-side fixing element for interaction with a complementary tank-side water filter cartridge fixing element, in particular in the form of a bayonet closure. Thus it is possible to provide a fixed connection between the water filter cartridge and the water tank. This also acts in a stabilizing manner on the position and thus positively on the action of the sealing elements configured and/or arranged on the water filter cartridge and the water tank.

An ion exchanger material may be arranged in the filter chamber. The water conducted over said ion exchanger material may be sufficiently descaled thereby that no quantities of limescale, or at least only small quantities of limescale, crystallize when the water is subsequently heated.

The water filter cartridge may also comprise a particle filter and/or an activated carbon filter. The particle filter protects against coarse contaminants and the activated carbon filter ensures the acceptable palatability of the water which has passed through the water filter cartridge.

The complementary water filter cartridge connecting element which is arranged on the tank side and which is configured, in particular, as the tank outlet valve, is configured as a double valve with concentrically arranged valve passages. This permits the connection of the water filter cartridge with its two water cartridge outlets, which are also concentrically arranged, to a single connecting element which, as set forth above, significantly contributes to the reliability of the connecting seals.

The two valves of the double valve in each case form a spring-loaded valve. As a result, when not subjected to load from the outside, the two valves are able to seal the water tank due to the closing force acting from the respective spring on the respective valve tappet. The tank may be filled with water to be stored. Only when at least one of these valve tappets is pressed against does the relevant valve open against the spring force acting thereon, and optionally water stored in the water tank may then flow out or, in the state connected to a beverage processing machine, may be drawn out of the water tank through said machine.

In order to provide an operationally secure connection between the water tank and a beverage processing machine, preferably a tank-side appliance connection, with two water outlets which are arranged concentrically to one another, may also be configured on the water tank. This tank-side appliance connection is preferably configured in a complementary manner to a tank connecting element which is arranged on the appliance side and accordingly cooperates therewith for supplying water to the beverage processing machine.

The invention further relates to a water processing machine with water tank and water filter cartridge. This water processing machine is characterized in that the water tank and the water filter cartridge are configured according to one of the above-described embodiments.

In particular, the beverage processing machine comprises a complementary tank connection which is arranged or which may be arranged on the appliance side for a tank-side appliance connection of a water tank to two water outlets which are arranged concentrically to one another according to one of the above-described embodiments.

This tank connection acts in an opening manner on the two valves of the double valve when the water tank is connected to the beverage processing machine, so that the machine may draw water, which has been processed by the water filter cartridge via two different filter sections, from the water tank. Once for the provision of cold-processed beverages and once for the provision of hot-processed beverages.

DESCRIPTION OF AN EXEMPLARY EMBODIMENT

The invention is described in more detail hereinafter with reference to the figures.

In the figures by way of example and schematically:

FIG. 1: shows a partial view of a water tank having a water filter cartridge inserted therein in a sectional view with two water filter cartridge outlets which are arranged concentrically to one another and having a tank-side machine connecting element and a machine-side tank connecting element spaced apart therefrom.

Figure 2:
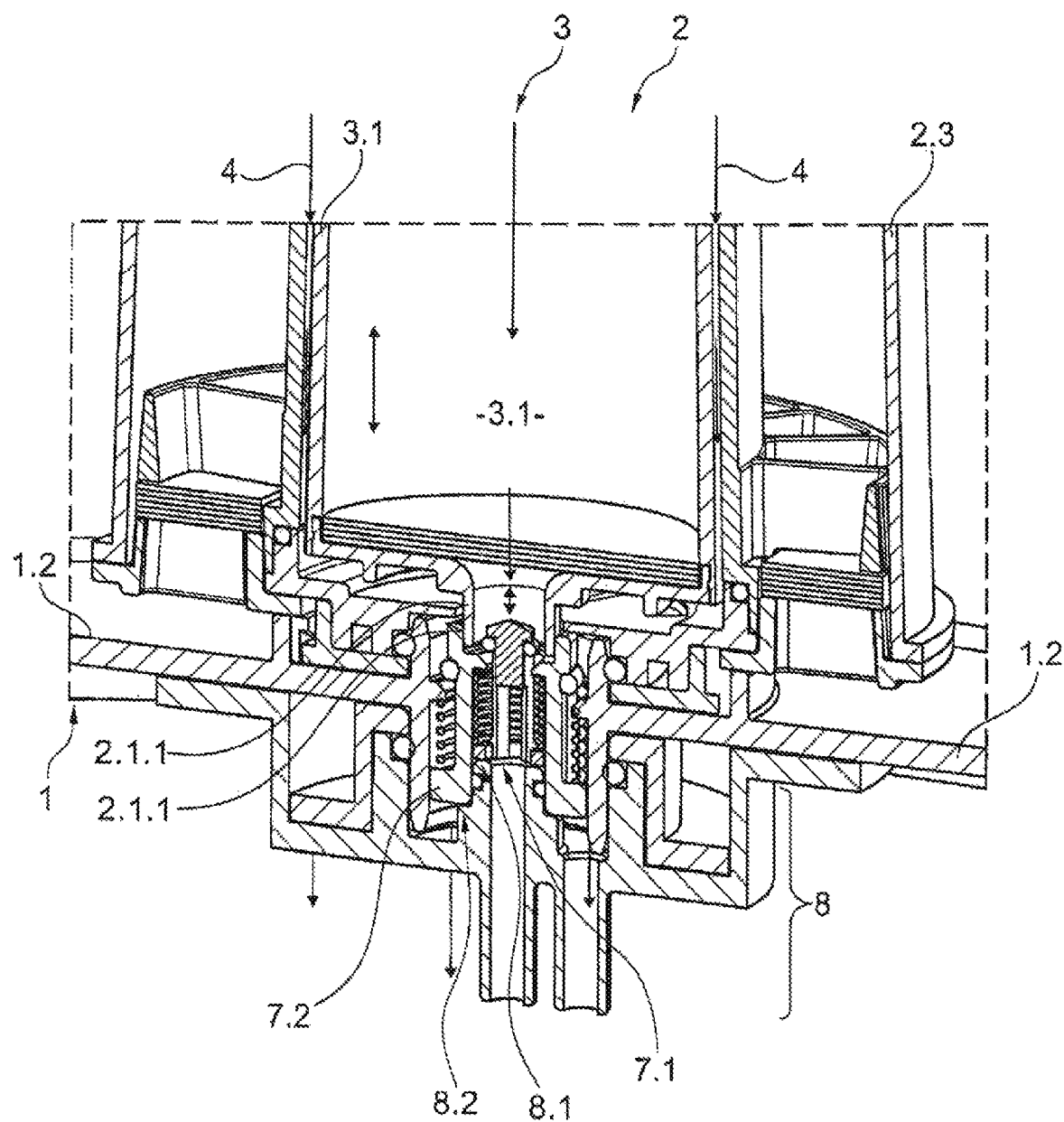

FIG. 2: shows a view as in FIG. 1 but with the connecting elements joined together.

Figure 3:
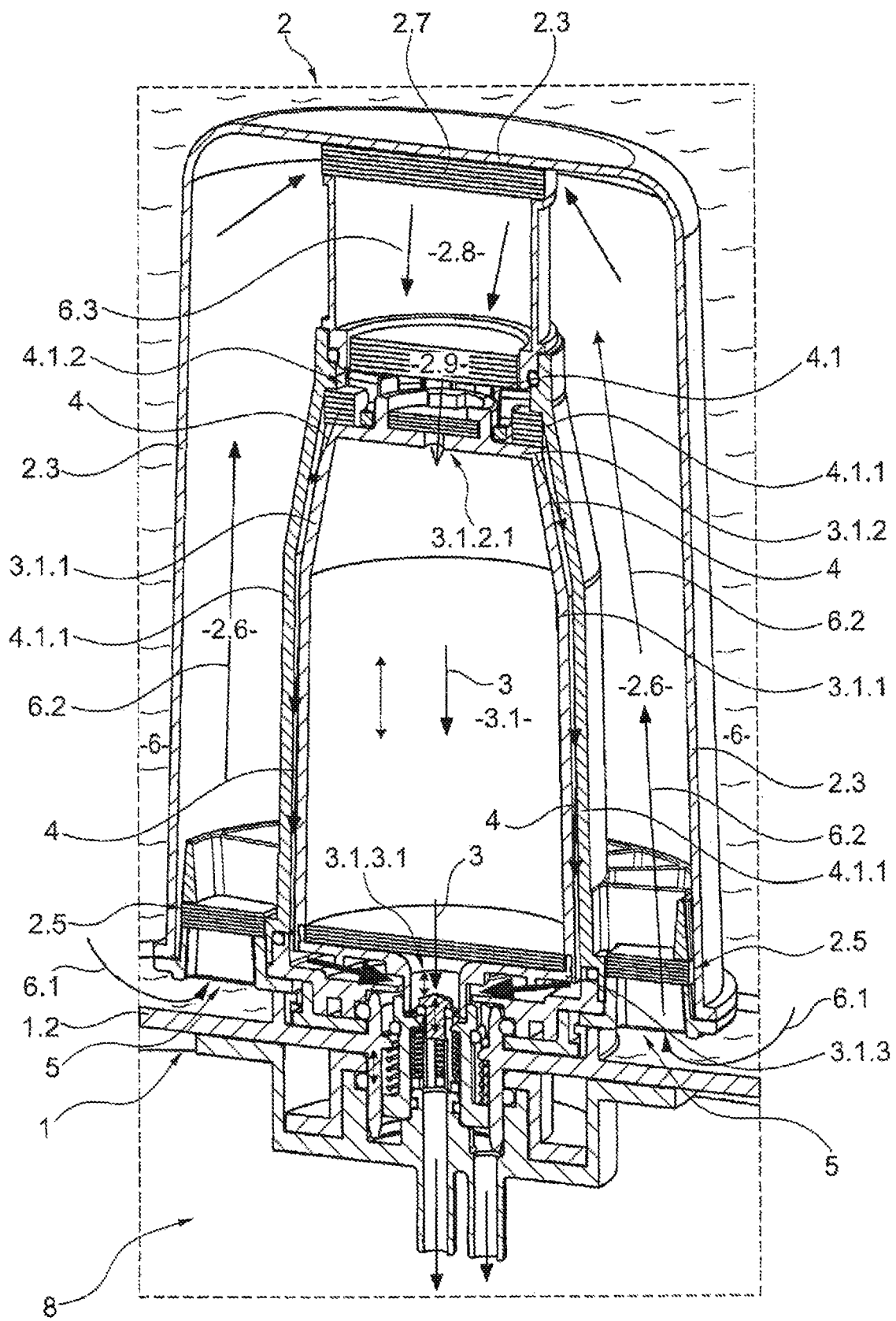

FIG. 3: shows a similar view to FIG. 2, but with a focus on the water filter cartridge with two hydraulically separated flow channels and the two water filter cartridge outlets which are arranged concentrically to one another for providing two differently processed filtrate flows.

Accordingly, FIG. 1 shows a detailed sectional view of a water tank 1 with the water filter cartridge 2 inserted therein.

The water filter cartridge 2 has two water filter cartridge outlets which are arranged concentrically to one another, a first inner water filter cartridge outlet 2.1 and a second outer water filter cartridge outlet 2.2. These water filter cartridge outlets are assigned to two flow channels, a first flow channel 3 and a second flow channel 4, which lead through the water filter cartridge 2 and which are hydraulically separated from one another.

The water filter cartridge 2 is supplied with water 6 stored in the water tank 1 via the inlet 5 thereof. The direction of flow of the water 6 is shown symbolically by the arrows 6.1.

The water tank 1 comprises a tank-side machine connecting element 7 extending away from and below the bottom 1.2 thereof. This machine connecting element 7 is of sleeve-like configuration and is provided for the sealed connection to a machine-side tank connecting element 8, shown spaced apart from the tank 1. For the sealed interaction between the water tank and the beverage processing machine, the tank connecting element 8 has a recess/receiver 8.3 which is shaped in a complementary manner for receiving the machine connecting element 7. For increasing the sealing action of this connection, a sealing element 8.3.1, for example an O-ring, may be provided between the machine connecting element 7 and the recess/receiver 8.3. This sealing element 8.3.1 is preferably arranged on the recess/receiver 8.3

The machine connecting element 7 also comprises two water tank outlet valves 7.1, 7.2 which are arranged concentrically to one another therein. The concentrically internal water tank outlet valve 7.1 is configured for opening and closing the first flow channel 3 through the water filter cartridge 2. The concentrically external water tank outlet valve 7.2 is configured for opening and closing the second flow channel 4 through the water filter cartridge 2, said second flow channel being configured separately from the first flow channel.

The first water tank outlet valve 7.1 is arranged in a component of the machine connecting element 7 which itself acts as a valve tappet of the second water tank outlet valve 7.2. It comprises a valve seat which is preferably configured as part of the second water tank outlet valve 7.2. The valve tappet of this first water tank outlet valve 7.1 is concentrically received in an opening of the valve tappet of the second water tank outlet valve 7.2, and in particular sealingly pretensioned by means of a restoring spring so as to bear against the valve seat. For increasing the sealing action, in this embodiment a sealing element in the form of an O-ring is arranged between the valve seat and the valve tappet.

This first water tank outlet valve 7.1 is configured in a sealing state to be movable with the valve tappet of the second water tank outlet valve 7.2. In other words, when the valve tappet of the second external water tank outlet valve 7.2 is lifted by actuation, i.e. is pressed against the interior of the water tank, for example by placing the tank-side machine connecting element 7 onto the complementary activation element 8.2 of the appliance-side tank connecting element, in principle this has no effect on the closing state of the first internal water tank outlet valve 7.1. Starting from a resting position, this first internal water tank outlet valve still remains closed.

When the water filter cartridge 2 is inserted in the water tank 1, in order to ensure a permanently reliable seal between the connecting pipe and the first water filter cartridge outlet 2.1, in this case in the form of the tubular portion 2.1.1, even in the case of such an at least axial positional change of the first water tank outlet valve 7.1 assigned thereto, the filter chamber 3.1 connected thereto is also at least axially arranged in the receiving chamber of the water filter cartridge 2.

This has the effect that irrespective of the closing state of the second external water tank outlet valve 7.2, the first internal water tank outlet valve 7.1 remains closed when handled in the customary manner, until it is activated by an activation element 8.1 which is complementary thereto on the appliance-side tank connecting element 8. Moreover, when handled during normal operation, this is only possible when the water tank is placed onto the machine-side tank connecting element.

The reliable sealing action between the first water tank outlet valve 7.1 and the tubular portion 2.1.1 is ensured even in the case of the second water tank outlet valve 7.2 being potentially jammed on the machine-side tank connecting element 8 when the water tank 1 is removed. This is because a potential pulling action on the connection between the first water tank outlet valve 7.1 and the tubular portion 2.1.1 is prevented by the filter chamber 3.1, which is connected thereto, being arranged so as to be axially movable and lifted in the water filter cartridge 2 in the correctly operated state.

If the second water tank outlet valve 7.2 were to be jammed, therefore, and thus not immediately released with the removal of the water tank 1, the axial play of the filter chamber 3.1 ensures a sufficient relative freedom of movement of the portion 2.1.1, which is fixedly connected thereto, relative to the filter cartridge 2, so that this portion may participate sufficiently in the relative movement of the second water tank outlet valve 7.2 in relation to the water filter cartridge 1 until the valve tappet of the second water tank outlet valve 7.2 is forcibly released from the recess/receiver 8.3 of the machine-side tank connecting element 8. This is implemented by the mechanical positioning of the sealing region of the valve tappet on the valve seat defining the range of movement of the first valve tappet. As soon as the valve tappet bears against the valve tappet, it has to be forcibly disengaged from the recess/receiver 8.3 of the machine-side tank connecting element.

Thus no water is able to be discharged from the water tank 1 via the first filter channel 3 until the water tank outlet valve 7.1 is appropriately lifted by the activation element 8.1.

For example a descaling agent, for example an ion exchanger, may be arranged in the filter chamber 3.1 in order to treat the water 6 to be processed by the filter cartridge 2 as far as possible against precipitates when the water is heated for preparing hot beverages. Preferably, a further filter section, for example an activated carbon filter for sterilization and/or improving the flavor, is already arranged upstream of the filter chamber 3.1 in the filter cartridge 2, in particular also for processing the water 6 conducted past the filter chamber 3.1 via the flow channel 4.

When the water tank 1 is removed from the machine-side tank connecting element 8, the valve tappet of the second water tank outlet valve 7.2 is in turn also sealingly pressed by means of a restoring spring against the valve seat of the second water tank outlet valve 7.2, preferably also by using an interposed sealing element, in particular an O-ring. The second water tank outlet valve 7.2 closes or opens the flow channel 4 of the water filter cartridge 2, in the state thereof inserted into the water tank, as shown in FIG. 1. The flow channel 4 runs between the external wall of the filter chamber 3.1, which is arranged so as to be at least axially movable in the filter cartridge 2, and the internal wall of the receiving chamber 4.1 movably receiving this filter chamber 3.1 (see also FIG. 3).

In order to improve the sealing action outwardly when the tank-side machine connecting element 7 is inserted into the machine-side tank connecting element 8 (see FIG. 2), a sealing element 8.3.1, preferably once again in the form of an O-ring, may also be arranged between the machine connecting element 7 and the recess/receiver which is complementary thereto in the machine-side tank connecting element 8. A sealing element 8.1.1, preferably once again in the form of an O-ring, may be arranged in order to increase the selling action inwardly.

For the sake of completeness, a beverage processing machine 10 is shown schematically or the two pipelines 9.1 and 9.2 starting from the machine-side tank connecting element 8, for conveying the two filtrate flows of the flow channels 3 and 4 which are hydraulically separated from one another. The filtrate flow of the flow channel 3 is conducted centrally through the machine-side tank connecting element 8 into the pipeline 9.1. The filtrate flow of the flow channel 4 is conducted to the pipeline 9.2 via the chamber 8.3.2 formed by the recess/receiver 8.3.

On the inner face of the water tank 1, the water filter cartridge 2 is connected with a cartridge-side tank connecting element 2.4 to a tank-side water filter cartridge connecting element 1.1. Preferably, in this case these elements are two sleeve-like components which are complementary to one another and which are configured so as to be able to be plugged into one another. A sealing element 2.4.1, for example in the form of an O ring, may be arranged therebetween in order to increase the sealing action.

For fixing to the water tank 1, the water filter cartridge 2 may have a cartridge-side fixing element 2.4.2 for interaction with a complementary tank-side water filter cartridge fixing element 1.1.1, in particular in the form of a bayonet closure.

FIG. 2 also shows in detail and in sectional view the water tank 1 with the water filter cartridge 2 inserted therein, wherein in contrast to FIG. 1, however, the tank-side machine connecting element 7 is connected to the machine-side tank connecting element 8/inserted therein.

The valve tappet of the first water tank outlet valve 7.1 is positioned on the activation element 8.1 and the valve tappet of the second water tank outlet valve 7.2 is positioned on the activation element 8.2 so that the two water tank outlet valves of the water tank 1 are opened.

The tubular portion 2.1.1 of the first water cartridge outlet 2.1 is produced from a more flexible material than the complementary water filter cartridge connecting element 1.1 arranged on the tank side. The tubular portion connected sealingly thereto in the manner of a plug element. In the present example, the tubular portion 2.1.1 is inserted into a recess of the valve tappet of the second radially external water tank outlet valve of the two water tank outlet valves 7.1 and 7.2 which are arranged concentrically to one another. Alternatively, the tubular portion 2.1.1 could also be configured such that it is able to be sealingly plugged onto the valve tappet of the second water tank outlet valve 7.2.

FIG. 3 shows once again in detail and in sectional view the water tank 1 with the water filter cartridge 2 inserted therein as in FIG. 2, wherein here the emphasis is on the filter cartridge 2 which is shown over the entire vertical extension of the housing 2.3 thereof.

A first filter element and/or retaining element 2.5, for example in the form of a non-woven fabric or sieve, is arranged in the region of the inlet 5 of the filter cartridge 2. A filter chamber 2.6 is adjacent to the rear thereof in the interior of the housing 2.3, for example an activated carbon filter being able to be arranged in said filter chamber.

The water 6 flowing from the water tank 1 into the water filter cartridge 2 flows through this filter chamber 2.6 in the direction of the arrow 6.2. A further filter element and/or retaining element 2.7, for example also in the form of a non-woven fabric or sieve, is arranged on the inner face of the housing 2.3 of the water filter cartridge 2 opposing the inlet 5. This filter element and/or retaining element may also have resilient properties, for example, in order to support further components to be received in the housing of the water filter cartridge, when assembling the water filter cartridge, in particular at least with slight pretensioning. This also brings about a greater sealing action between the individual components of the water filter cartridge 2 relative to the undesired migration of granular particles.

In the direction of flow of the water 6 a filter chamber 2.8 is adjacent to the filter element and/or retaining element 2.7 in the interior of the water filter cartridge 2. This filter chamber may be provided, for example, with a particle filter and sealed downstream by a further filter element and/or retaining element 2.9 relative to the discharge of filter material, but may be still permeable to the water 6 to be processed. This filter chamber 2.8 may be configured as an insert component, optionally comprising the two filter elements and/or retaining elements 2.7 and 2.9.

The receiving chamber 4.1 follows the filter element and/or retaining element 2.9 in the direction of flow of the water 6 according to the direction of the arrows 6.3. The receiving chamber is defined by the wall 4.1.1 and separated from the filter chamber 2.6 in a water-tight manner.

The filter chamber 3.1 is received so as to be at least axially movable, but preferably also radially movable, in the interior of the receiving chamber 4.1. This filter chamber 3.1 is sealed in a water-tight manner relative to the receiving chamber 4.1 by the wall 3.1.1 thereof and the top and bottom elements 3.1.2 and 3.1.3 thereof on the front face.

An inlet opening 1.2.1 into the filter chamber 3.1 is configured or the top element 3.2. An opening 3.1.3.1 is also configured on the bottom element 3.1.3. This opening is the outlet opening for the discharge of the water processed further in the filter chamber 3.1. In each case a further filter element and/or retaining element is arranged both on the inlet opening and on the outlet opening in order to prevent a discharge of filter material from the filter chamber 3.1, but in order to be able to permit water to flow through.

The first water filter cartridge outlet 2.1 in the form of the tubular portion 2.1.1, already described further above, is integrally formed around the outlet 3.1.3.1 at the bottom 3.1.3 of the filter chamber 3.1 and fixedly connected thereto. This tubular portion is configured from a more flexible material than the valve tappet of the second tank outlet valve 7.2 and inserted in a clamped manner into the recess thereof. As a result, the tubular portion 2.1.1 and the filter chamber 3.1 fixedly connected thereto may participate, in particular axially, but preferably also radially, in a movement assigned to the valve tappet of the second tank outlet valve 7.2 when the water tank is removed from the machine-side tank connecting element 8, potentially by the valve tappet being clamped in the recess/receiver 8.3.

The water 6 to be processed by the water filter cartridge 2 and removed from the water tank flows into the inlet region of the receiving chamber 4.1 in the direction of the arrows 6.1 to 6.3 as a water flow processed jointly by the filter sections 2.5 to 2.9 through which the water flows. In the inlet region of the receiving chamber 4.1 this water flow is divided into two flow paths 3 and 4 which are hydraulically separated from one another.

The first flow path 3 leads through the filter chamber 3.1 and the descaling agent arranged therein, such as for example an ion exchanger. As a result, the water to be removed from the water tank 1, for processing a hot beverage by means of the beverage processing machine 10, is descaled (see FIG. 1).

The second flow path 4 conducts the water 6 already processed by the filter sections 2.5 to 2.9 through the receiving chamber 4.1, past the filter chamber 3.1 to the second water filter cartridge outlet 2.2. The water 6 conducted via this flow path 4 is provided for processing a cold beverage by means of the beverage processing machine 10.

In order to be able to position the filter chamber 3.1 spaced apart from the wall 4.1.1 in the receiving chamber, ribs and/or studs or similar spacing elements 4.1.2 are arranged on the wall 4.1.1 and/or on the wall 3.1.1 of the filter chamber 3.1. In FIG. 3 such spacing elements are shown by way of example in the inlet region of the receiving chamber.

In order to avoid a backsiphonage effect respectively from the other of the two flow channels 3 and 4, a non-return valve may be arranged in at least one of the two flow channels, but preferably in both flow channels.

LIST OF REFERENCE NUMERALS

1 Water tank
1.1 Tank-side water filter cartridge connecting element
1.1.1 Tank-side fixing element
1.2 Bottom
2 Water filter cartridge
2.1 First water filter cartridge outlet
2.1.1 Tubular portion
2.1.1.1 Sealing surface
2.2 Second water filter cartridge outlet
2.3 Housing
2.4 Cartridge-side tank connecting element
2.4.1 Sealing element
2.4.2 Cartridge-side fixing element
2.5 Filter element and/or retaining element
2.6 Filter chamber/activated carbon
2.7 Filter element and/or retaining element
2.8 Filter chamber 2.9 Filter element and/or retaining element
3 First flow path
3.1 Filter chamber
3.1.2 Top
3.1.3 Bottom
3.1.3.1 Outlet
4 Second flow path
4.1 Receiving chamber
4.1.1 Wall
4.1.2 Ribs/studs/spacing elements
5 Inlet
6 Water
6.1 Arrow
6.2 Arrow
6.3 Arrow
7 Tank-side machine connecting element
7.1 First water tank outlet valve
7.2 Second water tank outlet valve
8 Machine-side tank connecting element
8.1 Activation element
8.1.1 Sealing element
8.2 Activation element
8.3 Recess/receiver
8.3.1 Sealing element
8.3.2 Chamber
9.1 Pipeline
9.2 Pipeline
10 Beverage processing machine/appliance

The invention claimed is:

1. A water tank connecting element (1.1) and water filter cartridge (2) comprising the tank connecting element (1.1) and filter housing (2.3) having a first and second water filter cartridge outlet (2.1; 2.2) arranged concentrically to one another wherein the first (2.1) water filter cartridge outlet is connected to a first treatment flow channel (3) of the water filter cartridge and the second water filter cartridge outlet (2.2) is connected to a second treatment flow channel (4) of the water filter cartridge isolated from the first treatment flow channel and wherein the first water filter cartridge outlet (2.1) and the second water filter cartridge outlet (2.2) are isolated from one another and wherein the filter housing (2.3) is axially connectable to the tank connecting element (1.1).

2. The water tank connecting element and water filter cartridge according to claim 1 wherein the first water filter cartridge outlet (2.1) has a tubular portion (2.1.1) for a water-tight connection with an outlet valve (7.2), and the filter housing is radially moveable to provide the water tight connection.

3. The water tank connecting element and water filter cartridge according to claim 2 wherein a tubular portion (2.1.1) is constructed of a more flexible material than the water filter cartridge connecting element (1.1) or a tank outlet valve (7.2), disposed on a tank side water tank connection.

4. The water tank connecting element and water filter cartridge according to claim 1 or 2 wherein the tubular portion (2.1.1) forms a sealing surface (2.1.1.1) which moves radially to the tank connection element.

5. The water tank connecting element and water filter cartridge according to claim 1 wherein the first treatment flow channel (3) and the second treatment flow channel (4) have at least in a common treatment path in a common flow chamber through the water filter cartridge (2).

6. The water tank connecting element and water filter cartridge according to claim 1 wherein the first flow channel (3) comprises a moveable filter chamber (3.1) arranged to be at least axially and radially, movable in the housing (2.3) of the (2) water filter cartridge.

7. The water tank connecting element and water filter cartridge according to claim 6 further comprising spacing ribs and/or spacing studs on the moveable filter chamber (3.1) and/or in a complementary receiving chamber (4.1) for the filter chamber (3.1) in the water filter cartridge (2), for spacing apart the two chambers (3.1; 4.1) from one another.

8. The water tank connecting element and water filter cartridge according to claim 7 wherein the complementary receiving chamber (4.1) for the filter chamber (3.1) is configured as a flow chamber without filter material and as part of the second flow channel (4).

9. The water tank connecting element and water filter cartridge according to claim 6 further comprising a non-return valve disposed in at least one of the two flow channels (3; 4).

10. The water tank connecting element and water filter cartridge according to claim 1 further comprising a non-return valve disposed in the second of the two flow channels (3; 4.

11. The water tank connecting element and water filter cartridge according to claim 1 wherein the water filter cartridge (2) has a cartridge-side fixing element (2.4.2) for connection with a complementary tank-side water filter cartridge fixing element (1.1.1) or a bayonet closure.

12. The water tank connecting element and water filter cartridge according to one of claim 6 further comprising an ion exchanger material disposed in the filter chamber (3.1).

13. The water tank connecting element and water filter cartridge according to claim 1 wherein the water filter cartridge (2) has a particle filter and/or an activated carbon filter.

14. The water tank connecting element and water filter cartridge according to claim 2 wherein the water filter cartridge connecting element (1.1) is disposed on a tank side and is configured as a tank outlet valve or as a double valve with concentrically arranged valves (7.1; 7.2).

15. The water tank connecting element and water filter cartridge according to claim 1 further comprising two valves (7.1; 7.2) or a double valve or a spring-loaded valve (7.1; 7.2).

16. The water tank connecting element and water filter cartridge according to claim 1 further comprising a tank-side appliance connection (7), with two water outlets arranged concentrically to one another on the water tank (1).

17. The water tank and connecting element of claim 1 further comprising a water processing machine (10) wherein the water processing machine has a water tank (1) with the connecting element (1.1) and the water filter cartridge (2).

18. A filter device comprising:
   (a) a first flow path from a first filter treatment section;
   (b) a second flow path and a second filter treatment section separate and isolated from the first flow path;
   (c) a first outlet connected to the first flow path;
   (d) a second outlet isolated from the first outlet and connected to the second flow path; and
   (e) a housing having an inlet common to the first flow path and the second flow path.

19. The filter device of claim 18 wherein the housing has an outlet opening circumscribing the first outlet and the second outlet.

20. The filter device of claim 19 wherein the first outlet and second outlet are arranged concentrically in the outlet opening.

21. A filter device connector comprising:
(a) a first inlet disposed along the axial length of the filter device connector;
(b) a second inlet disposed at a different level than the first inlet disposed along the axial length of the filter device connector and isolated from the first inlet;
(c) a first outlet connected to the first inlet;
(d) a second outlet isolated from the first outlet and connected to the second inlet;
(e) a first seal surrounding the first inlet; and
(f) a second seal surrounding the second inlet.

* * * * *